(12) United States Patent
Geiger et al.

(10) Patent No.: US 11,117,724 B2
(45) Date of Patent: Sep. 14, 2021

(54) ADJUSTABLE CABLE TIE HEAD

(71) Applicant: HellermannTyton Corporation, Milwaukee, WI (US)

(72) Inventors: Gerard G. Geiger, Jackson, WI (US); Reese L. Vaughn, Milwaukee, WI (US)

(73) Assignee: HellermannTyton Corporation, Milwaukee, WI (US)

( * ) Notice: Subject to any disclaimer, the term of this patent is extended or adjusted under 35 U.S.C. 154(b) by 0 days.

(21) Appl. No.: 16/812,624

(22) Filed: Mar. 9, 2020

(65) Prior Publication Data

US 2020/0299041 A1    Sep. 24, 2020

Related U.S. Application Data

(60) Provisional application No. 62/820,369, filed on Mar. 19, 2019.

(51) Int. Cl.
*B65D 63/10*    (2006.01)

(52) U.S. Cl.
CPC .................. *B65D 63/1072* (2013.01)

(58) Field of Classification Search
CPC ......... F16L 3/137; F16L 3/127; F16L 3/2334; F16L 3/237; H02G 3/32; B65D 63/1072; Y10T 24/1498
See application file for complete search history.

(56) References Cited

U.S. PATENT DOCUMENTS

| | | | | |
|---|---|---|---|---|
| 3,735,448 | A * | 5/1973 | Waddington | B65D 63/1072 24/16 PB |
| 3,924,299 | A * | 12/1975 | McCormick | B65D 63/1081 24/16 PB |
| 4,138,770 | A | 2/1979 | Barrette et al. | |
| 4,688,302 | A * | 8/1987 | Caveney | B65D 63/1072 24/16 PB |
| 6,560,822 | B2 * | 5/2003 | Caveney | B65D 63/1036 24/16 PB |
| 6,807,714 | B2 | 10/2004 | O'Young et al. | |
| 7,661,633 | B2 * | 2/2010 | Igarashi | F16L 3/2334 248/74.3 |
| 8,407,863 | B2 * | 4/2013 | Cheng | B65D 63/1072 24/16 PB |
| 8,726,468 | B2 * | 5/2014 | Dyer | B65D 63/10 24/16 PB |
| 2006/0162130 | A1 | 7/2006 | Cook | |
| 2010/0236030 | A1 | 9/2010 | Dyer | |

(Continued)

FOREIGN PATENT DOCUMENTS

| | | |
|---|---|---|
| GB | 2037869 | 7/1980 |
| GB | 2145150 | 3/1985 |

OTHER PUBLICATIONS

"Extended European Search Report", EP Application No. 20163702.2, dated Aug. 10, 2020, 10 pages.

(Continued)

*Primary Examiner* — Robert Sandy
(74) *Attorney, Agent, or Firm* — Colby Nipper PLLC

(57) ABSTRACT

A cable tie includes a cable tie head; and a strap. The head is configured to receive the strap. A least part of the head comprises a deformable zone configured to deform when the strap is received in the cable tie head to secure the cable tie to an elongate article.

20 Claims, 12 Drawing Sheets

(56) References Cited

U.S. PATENT DOCUMENTS

| | | | |
|---|---|---|---|
| 2013/0119208 A1* | 5/2013 | Geiger | F16B 21/088 |
| | | | 248/68.1 |
| 2015/0102183 A1* | 4/2015 | Yamaguchi | B60R 16/0215 |
| | | | 248/74.3 |
| 2020/0223606 A1* | 7/2020 | Matz | H02G 3/0456 |

OTHER PUBLICATIONS

Purchase Order to HellermannTyton for Part No. LPT18L dated Jan. 7, 2018.
"HellermannTyton Data Sheet for Part No. LPT18L", Cable ties with low profile head, Dec. 3, 2021, 3 pages.

* cited by examiner

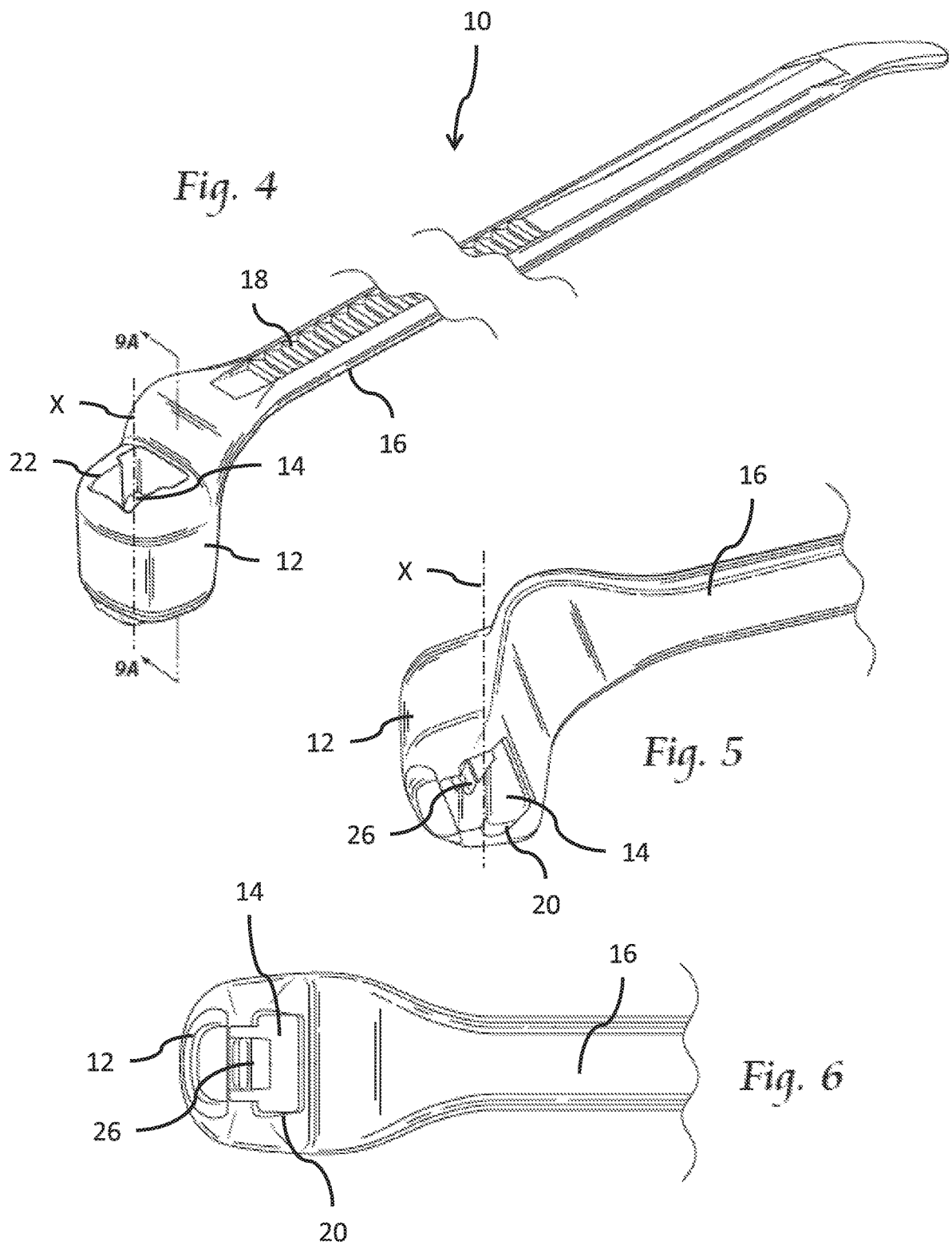

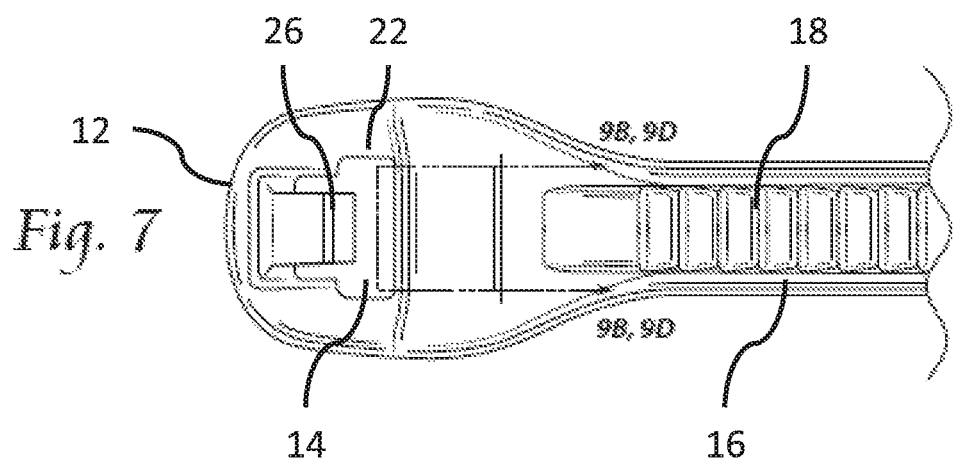
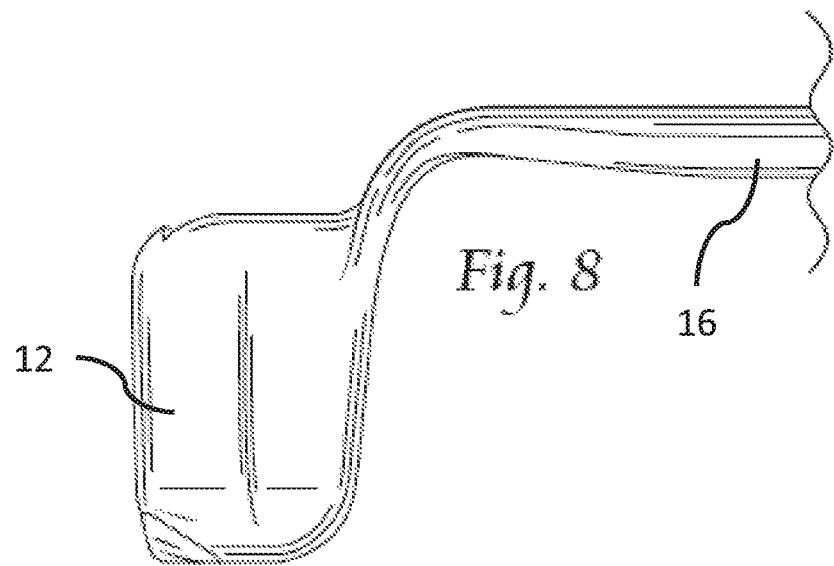
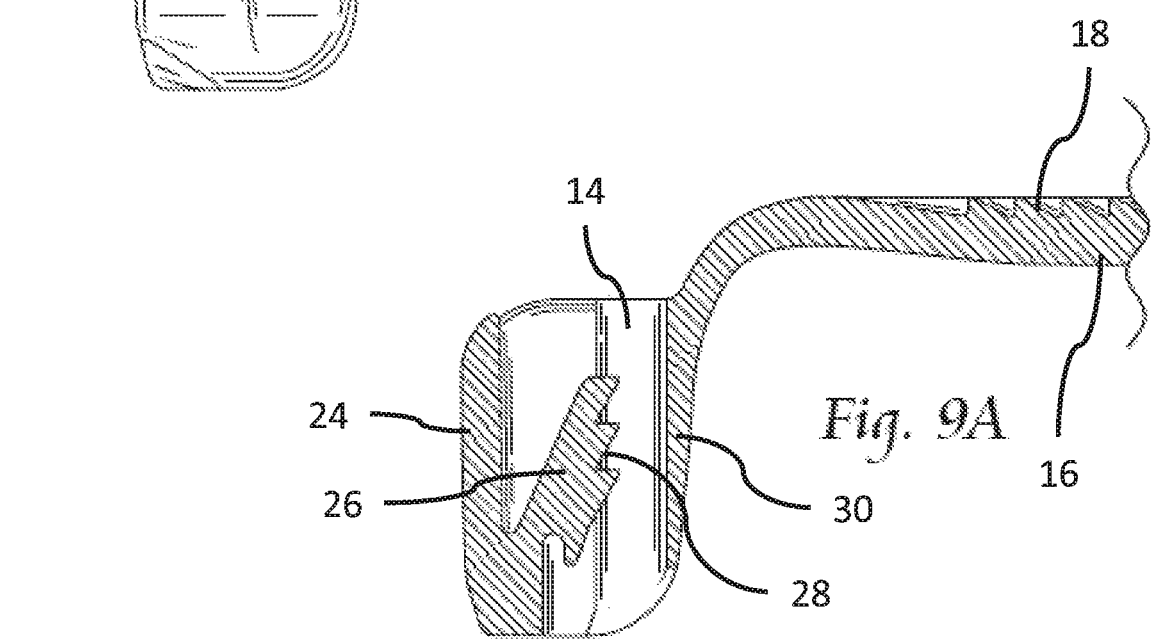

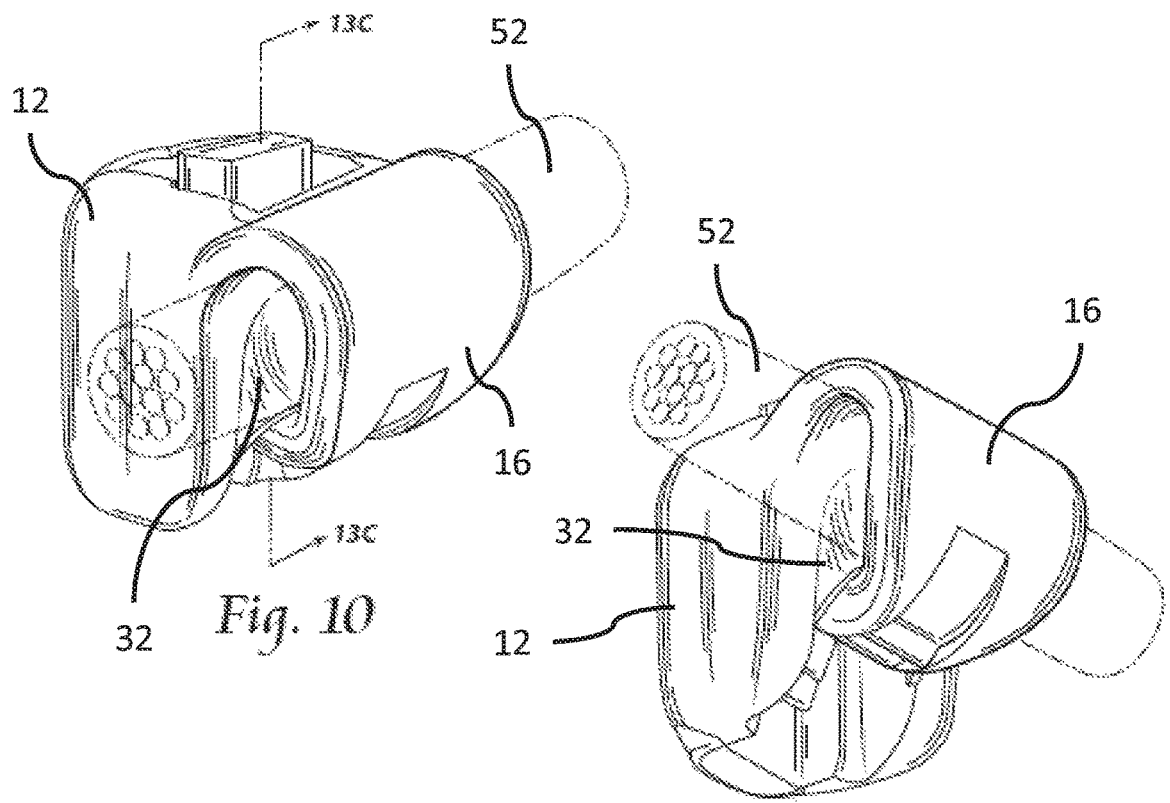
Fig. 10
Fig. 11A
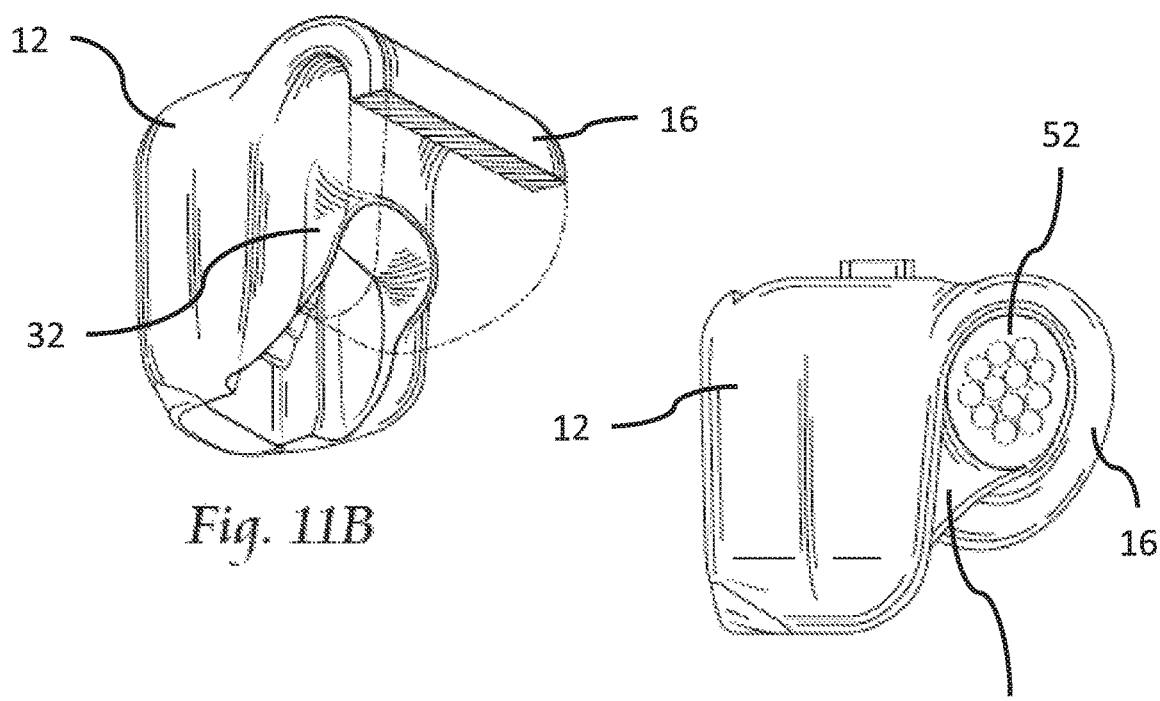
Fig. 11B
Fig. 12

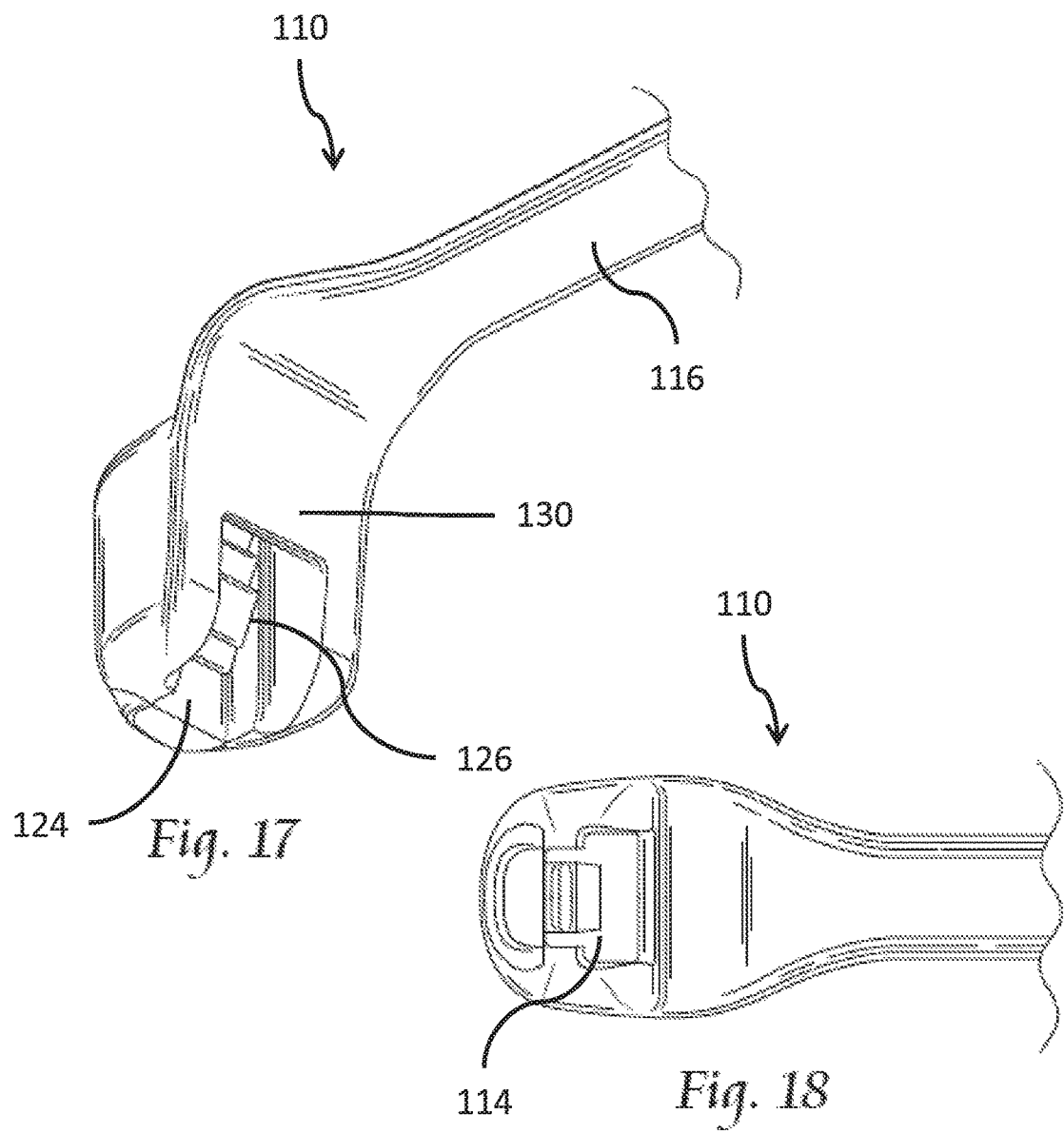
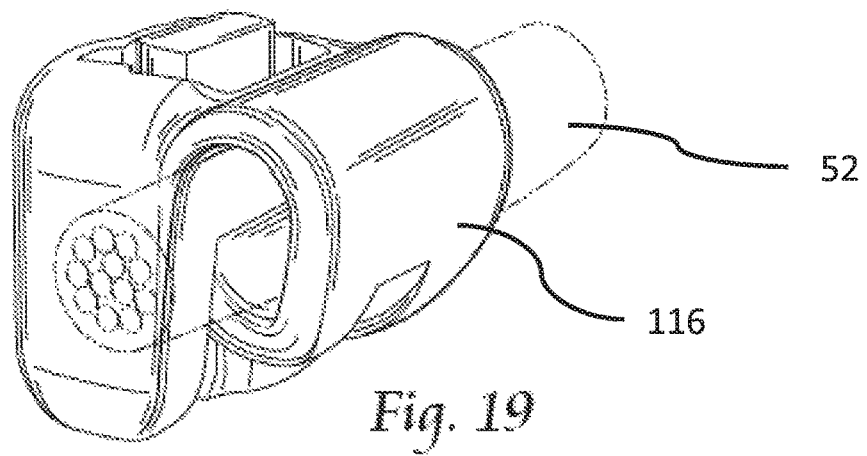

ADJUSTABLE CABLE TIE HEAD

CROSS-REFERENCE TO RELATED APPLICATION

This application claims the benefit under 35 USC § 119(e) of U.S. Provisional Patent Application No. 62/820,369 filed on Mar. 19, 2019, the entire disclosure of which is hereby incorporated by reference.

TECHNICAL FIELD OF THE INVENTION

The invention relates to cable ties, particularly a cable tie with an adjustable head.

BACKGROUND OF THE INVENTION

Cable ties that have a low-profile head are desired in applications that have tight packaging requirements. As shown in FIGS. 1 though 3B, prior low-profile head cable ties 1 may only have a pair of small contact points 2 between the cable tie 1 and an elongate article 3 having a small diameter in relation to the cable tie head 4, in these illustrated examples the elongate article is an insulated electrical wire(s) 3, retained within the cable tie 1. In these conditions the cable tie 1 may not be able to consistently secure the wire(s) 3 by generating sufficient tension in the cable tie strap 5, thereby allowing the wire(s) 3 to longitudinally within the cable tie 1 or rotate within the cable tie 1. The pawls 6 securing the serrations 7 of the cable tie strap 5 in these prior cable ties 1 may also tend to disengage when high tension forces (i.e. greater than 70 newtons) are applied to the cable tie strap 6. In addition, the cable tie strap 6 has tight bending angles that may concentrate stresses in the cable tie straps that could lead to a cable tie strap 6 failure.

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

According to a first embodiment of the invention, a cable tie is provided. The cable tie includes a cable tie head; and a strap. The cable tie head is configured to receive the strap. A least part of the cable tie head comprises a deformable zone configured to deform when the strap is received in the cable tie head to secure the cable tie to an elongate article.

In an example embodiment having one or more features of the cable tie of the previous paragraph, the cable tie head defines an aperture extending through the cable tie head having a first opening through which the strap enters the aperture and a second opening through which the strap exits the aperture. A first wall forming the aperture defines a pawl with a plurality of teeth configured to engage the plurality of serrations of the strap. A second wall forming the aperture arranged opposite the first wall has a deformable zone configured to deform in response to application of a force on the strap when securing the cable tie to the elongate article.

In an example embodiment having one or more features of the cable tie of the previous paragraph, the second wall defines a converging angle between the first thickness and the second thickness that is greater than 1 degree.

In an example embodiment having one or more features of the cable tie of the previous paragraph, the converging angle between the first thickness and the second thickness is in a range of 1 to 10 degrees inclusive.

In an example embodiment having one or more features of the cable tie of the previous paragraph, at least a section the deformable zone varies gradually between the first thickness and the second thickness.

In an example embodiment having one or more features of the cable tie of the previous paragraph, the at least a section of the deformable zone varies continuously between the first thickness and the second thickness.

In an example embodiment having one or more features of the cable tie of the previous paragraph, the deformable zone extends from a first portion with a first thickness that is proximate to the first opening to a second portion having a second thickness that is proximate the second opening and wherein the second thickness is greater than the first thickness.

In an example embodiment having one or more features of the cable tie of the previous paragraph, the aperture defines a third wall that is generally perpendicular to the second wall and wherein the third wall has a third thickness that is greater than a sum of the first thickness and the second thickness.

In an example embodiment having one or more features of the cable tie of the previous paragraph, a ratio of the first thickness to the second thickness in a range of 1:3 to 3:4.

In an example embodiment having one or more features of the cable tie of the previous paragraph, the strap extends from the cable tie head in a direction generally perpendicular to a longitudinal axis of the aperture extending from the first opening to the second opening.

In an example embodiment having one or more features of the cable tie of the previous paragraph, a ratio of a width of the second wall to a height of the second wall is in a range of 1:3 to 3:4.

In an example embodiment having one or more features of the cable tie of the previous paragraph, the deformable zone is flexible and configured to deform outwardly away from the first wall after the strap is inserted within the aperture and tightened around an elongate article.

In an example embodiment having one or more features of the cable tie of the previous paragraph, the second wall and the strap are in continuous contact 230 to 355 degrees of a circumference of the elongate article after the strap is inserted within the aperture and tightened around the elongate article.

In an example embodiment having one or more features of the cable tie of the previous paragraph, a loop diameter defined by the second wall and the strap is substantially equal to a diameter of the elongate article after the strap is inserted within the aperture and tightened around the elongate article.

In an example embodiment having one or more features of the cable tie of the previous paragraph, the second wall defines a slot that is less than a width of the second wall and wherein the slot extends through the deformable zone.

In an example embodiment having one or more features of the cable tie of the previous paragraph, the second wall defines a slot that is less than a width of the second wall and wherein the slot extends through the second wall opposite the pawl.

In an example embodiment having one or more features of the cable tie of the previous paragraph, the second wall is shorter than the first wall.

According to a second embodiment of the invention, a cable tie is provided. The cable tie includes a cable tie head, an aperture extending through the cable tie head, a strap defining a plurality of serrations extending from the cable tie head and configured to be received within the aperture. The aperture defines a first opening through which the strap enters the aperture and a second opening through which the strap exits the aperture. The cable tie also includes a first wall forming the aperture. The first wall defines a pawl with a plurality of teeth configured to engage the plurality of serrations of the strap. The cable tie further includes a second wall forming the aperture opposite the first wall. The second wall is shorter than the first wall and wherein the second wall does not extend past a first engaging tooth of the plurality of teeth of the pawl.

In an example embodiment having one or more features of the cable tie of the previous paragraph, the strap extends from the cable tie head in a direction generally perpendicular to a longitudinal axis of the aperture extending from the first opening to the second opening.

In an example embodiment having one or more features of the cable tie of the previous paragraph, the second wall and the strap are in continuous contact with 220 to 260 degrees of a circumference of the elongate article after the strap is inserted within the aperture and tightened around the elongate article.

According to a third embodiment of the invention, cable tie is provided. The cable tie includes a cable tie head, an aperture extending through the cable tie head, and a strap defining a plurality of serrations extending from the cable tie head and configured to be received within the aperture. The aperture defines a first opening through which the strap enters the aperture and a second opening through which the strap exits the aperture/The cable tie also includes a first wall forming the aperture. The first wall defines a pawl with a plurality of teeth configured to engage the plurality of serrations of the strap. The cable tie further includes a second wall forming the aperture opposite the first wall and means for deforming the second wall in response to application of a force on the strap when securing the cable tie to an elongate article.

BRIEF DESCRIPTION OF THE SEVERAL VIEWS OF THE DRAWING

The present invention will now be described, by way of example with reference to the accompanying drawings, in which:

FIG. 4 is a perspective top view of a cable tie according to a first embodiment of the invention;

FIG. 5 is a perspective bottom view of the cable tie of FIG. 4 according to the first embodiment of the invention;

FIG. 6 is a bottom plan view of the cable tie of FIG. 4 according to the first embodiment of the invention;

FIG. 7 is a top plan view of the cable tie of FIG. 4 according to the first embodiment of the invention;

FIG. 8 is a right-side view of the cable tie of FIG. 4 according to the first embodiment of the invention;

FIG. 9A is a cross section right side view of the cable tie along the section line 9A-9A of FIG. 4 according to the first embodiment of the invention;

FIG. 10 is a partial perspective top view of the cable tie of FIG. 4 wrapped around a single elongate article according to the first embodiment of the invention;

FIG. 11A is a partial perspective bottom view of the cable tie of FIG. 10 wrapped around the single elongate article according to the first embodiment of the invention;

FIG. 11B is a cut-away view of the cable tie of FIG. 11A according to the first embodiment of the invention;

FIG. 12 is a right view of the cable tie of FIG. 10 wrapped around the single elongate article according to the first embodiment of the invention;

FIG. 17 is a perspective bottom view a cable tie according to a second embodiment of the invention;

FIG. 18 is a bottom plan view the cable tie of FIG. 17 according to the second embodiment of the invention;

FIG. 19 is a partial perspective top view of the cable tie of FIG. 17 wrapped around a single elongate article according to the second embodiment of the invention;

Similar elements of the various embodiments share the last two digits of the reference numbers in the views of the drawing briefly described above and in the detailed description of the invention below.

DETAILED DESCRIPTION OF THE INVENTION

Figure 1:
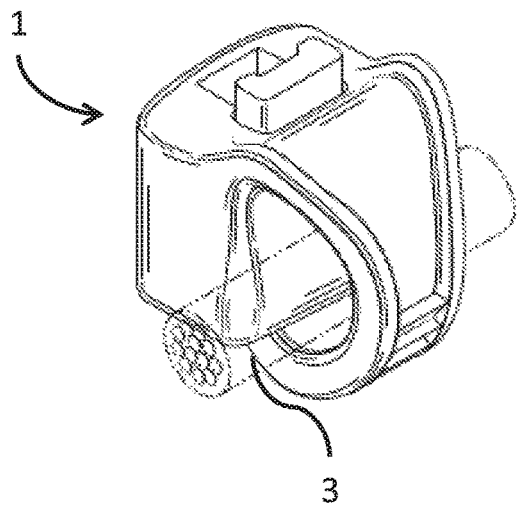
FIG. 1 is perspective view of a cable tie wrapped around a single elongate article according to the prior art.
Figure 2A:
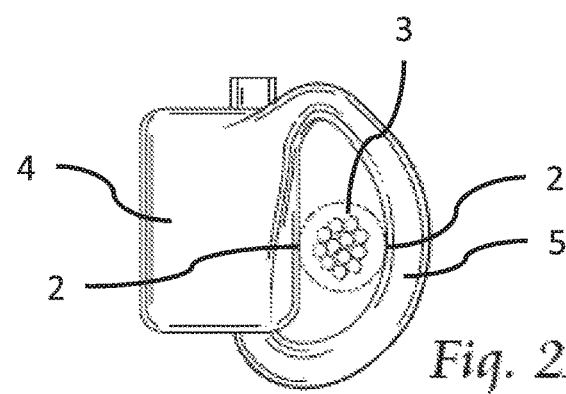
FIG. 2A is side view of the cable tie of FIG. 1 according to the prior art.
Figure 2B:
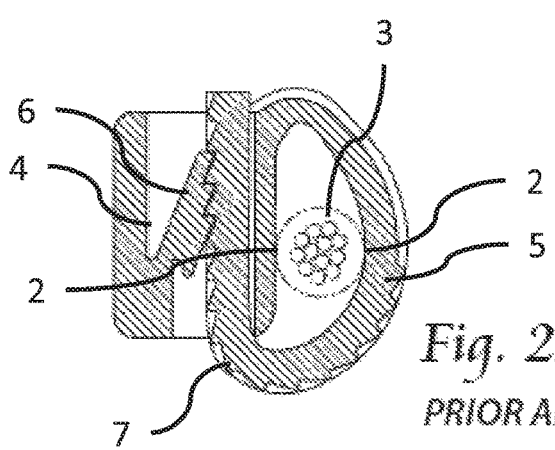
FIG. 2B is cross section view of the cable tie of FIG. 2A according to the prior art.
Figure 3A:
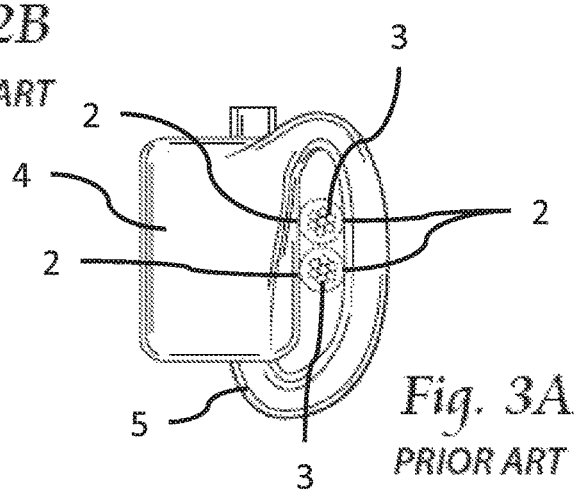
FIG. 3A is side view of the cable tie of FIG. 1 wrapped around two elongate articles according to the prior art.
Figure 3B:
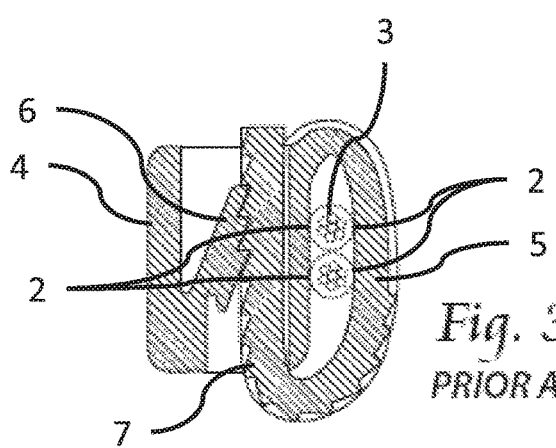
FIG. 3B is cross section view of the cable tie of FIG. 3A according to the prior art.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

FIGS. 4 to 16 illustrate a non-limiting example of a first embodiment of a cable tie that is configured to wrapped and tightened around an elongate article, such as solid electrical wires, stranded electrical cables, hydraulic hoses, pneumatic tubing, fiber optic cables, conduits, vines, and the like. The elongate article may include single or multiple solid electrical wires, stranded electrical cables, hydraulic hoses, pneumatic tubing, fiber optic cables, conduits, vines, or a combination thereof. The cable tie is configured so that an inner wall of the cable tie's head yields at different degrees of strap tension that is applied and flares outwardly to create a tight circumferential wrapping or looping. The cable tie may provide nearly 360 degrees of contact between the cable tie head, the cable tie strap, and the elongate article. This circumferential wrapping of the cable tie head and the cable tie strap around the elongate article inhibits longitudinal migration and rotation of the cable tie relative to the elongate article. Therefore, this cable tie will maintain the desired routing position and thereby prevent contact of the elongate article with adjacent elements. This precise routing performance is particularly required by the aerospace industry.

As illustrated in FIG. 4, the cable tie 10 includes a cable tie head, hereinafter referred to as the head 12, and cable tie strap, hereinafter referred to as the strap 16. The head 12 is configured to receive the strap 16. A least part of the head 12 comprises a deformable zone 32 that is configured to deform when the strap 16 is received in the head 12 to secure the cable tie 10 to an elongate article 52.

The head 12 has an aperture 14 that extends through the head 12. The strap 16, defines a plurality of serrations 18 extends from the head 12 and is configured to be received within the aperture 14. The strap 16 extends from the head 12 in a lateral direction that is generally perpendicular to a longitudinal axis X of the aperture 14 which extends from the first opening 20, shown in FIG. 4 to the second opening 22 shown in FIG. 4. The strap 16 is configured to enter the aperture 14 through the first opening 20 and exit the aperture 14 through the second opening 22. As best shown in FIG. 9A, the aperture 14 has a first wall 24 that defines a pawl 26 with a plurality of teeth 28 that are configured to engage the plurality of serrations 18 of the strap 16 in a ratcheting manner and hold the strap 16 in place as the strap 16 is inserted in the aperture 14. The aperture 14 also has a second wall 30 that is arranged opposite the first wall 24.

Figure 9B:
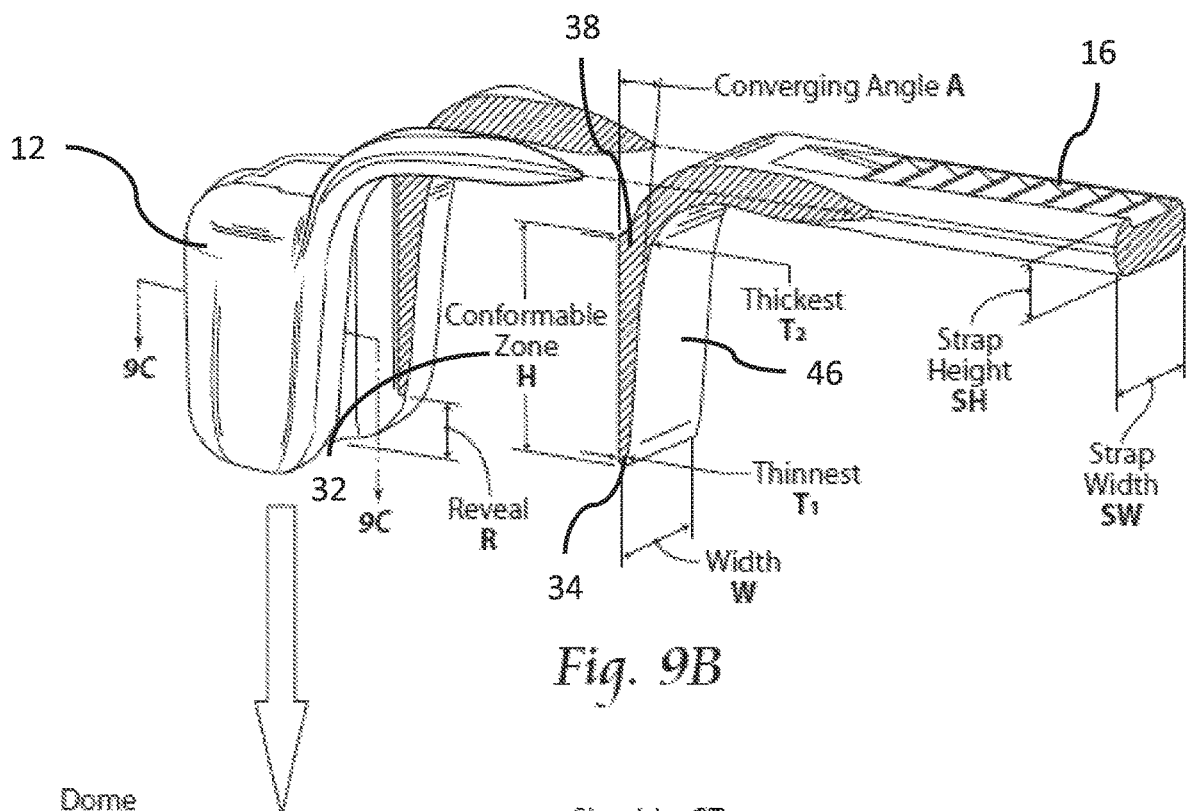
FIG. 9B is a cut away perspective view of the cable tie of FIG. 7 along the section line 9B-9B according to the first embodiment of the invention.

As best shown in FIG. 9B, the second wall 30 has a deformable zone 32 extending from a first portion 34 with a first thickness $T_1$ that is proximate to the first opening 20 to a second portion 38 having a second thickness $T_2$ that is proximate the second opening 22. The second thickness $T_2$ is greater than the first thickness $T_1$. The deformable zone 32 of the second wall 30 defines a converging angle A between the first thickness $T_1$ and the second thickness $T_2$. The converging angle A has an angular value that is greater than 1 degree. Preferably, the angle A may be in a range of 1 to 10 degrees wherein the limits are the range are included within the range. More preferably, the angle A may be in a range of 3 to 7 degrees. Even more preferably, the angle A may be in a range of 4 to 6 degrees. Yet even more preferably, the angle A may be in a range of 4.8 to 5.3 degrees.

A third thickness of a third portion 46 of the deformable zone 32 located between the first portion 34 and the second portion 38 generally varies increasingly and/or gradually and/or linearly and/or continuously or discontinuously (i.e. a step) between the first thickness $T_1$ and the second thickness $T_2$. As best shown in FIG. 9D, a ratio of the first thickness $T_1$ to the second thickness $T_2$ is in a range of 1:3 to 1:10, preferably in a range of 1:4 to 1:6 and more preferably in a range of about 2:9 to 2:11. A ratio of a width W of the second wall 30 to a height H of the second wall 30 is in a range of 1:3 to 3:4, preferably in a range of 4:10 to 5:8, and more preferably in a range of 1:2 to 5:9. The height H of the second wall 30 is preferably shorter than the height of the first wall 24. This difference between the height H of the second wall 30 and the height of the first wall 24 is hereinafter referred to as the reveal R. The height of the reveal R is preferably about 23% of the height H of the second wall 30.

In alternative embodiments, not all elements of the cable tie scale uniformly. For example, as the strap is widened to increase loop tensile strength, the first wall thickness, width, and height; the second wall thickness, width, and height, and the reveal may not change uniformly. This non-uniform change is also true for other elements in alternative embodiments.

The head 12 and the strap 16 are integrally formed and are preferably formed a polymeric material, such as polyamide 66, also known as NYLON 66.

As illustrated in FIGS. 10-12 and particularly in FIG. 11B, at least the first portion 34 of the deformable zone 32 is flexible and is configured to deform outwardly away from the first wall 24 after the strap 16 is inserted within the aperture 14 and tightened around an elongate article 52, in the illustrated example an insulated wire cable.

Figure 9C:
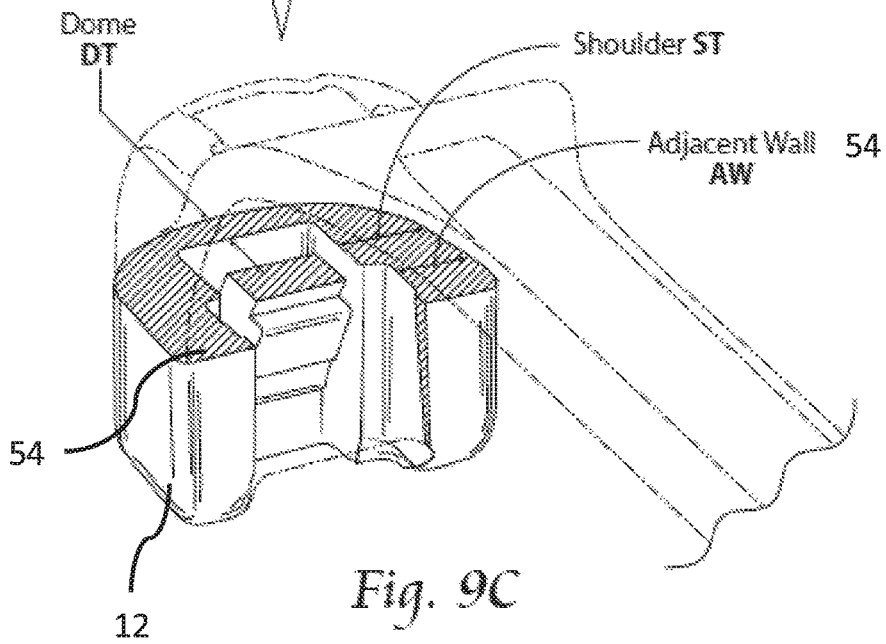
FIG. 9C is a cross section perspective top side view of the cable tie along the section line 9C-9C of FIG. 9B according to the first embodiment of the invention.
Figure 9D:
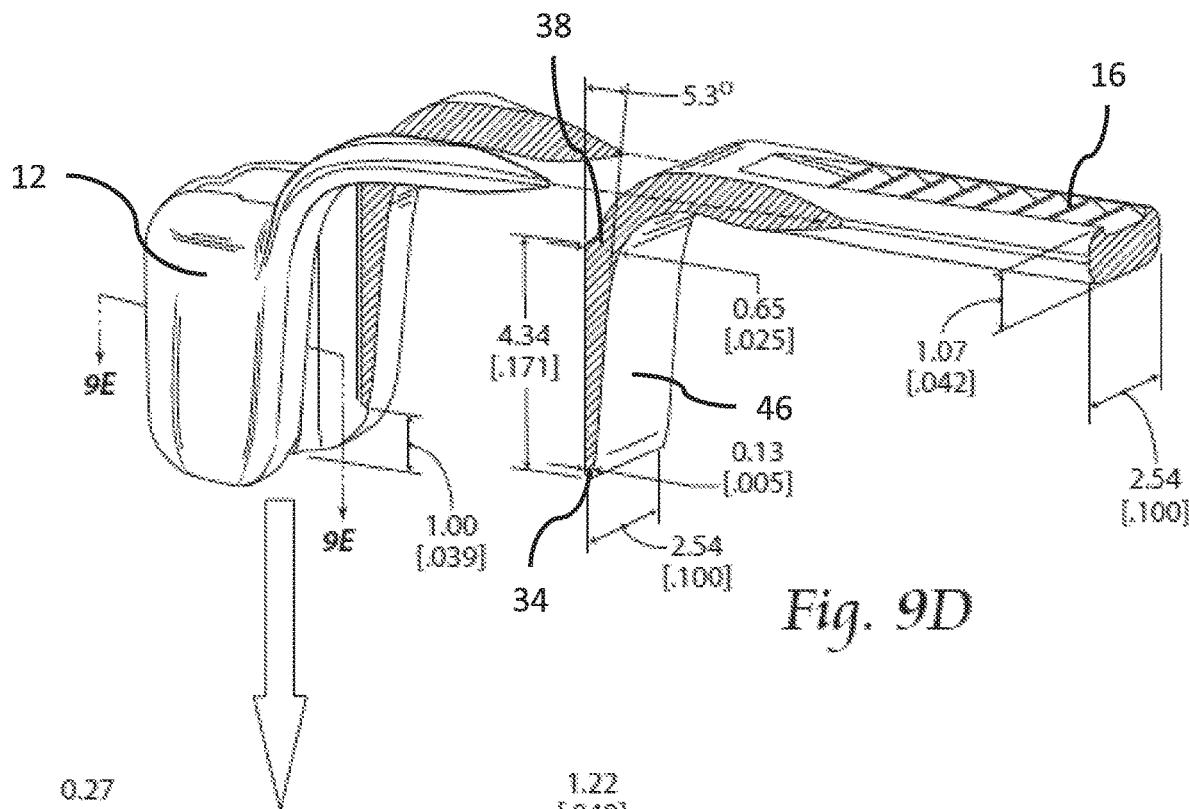
FIG. 9D is a dimensioned example of the cable tie of FIG. 9B according to the first embodiment of the invention.
Figure 9E:
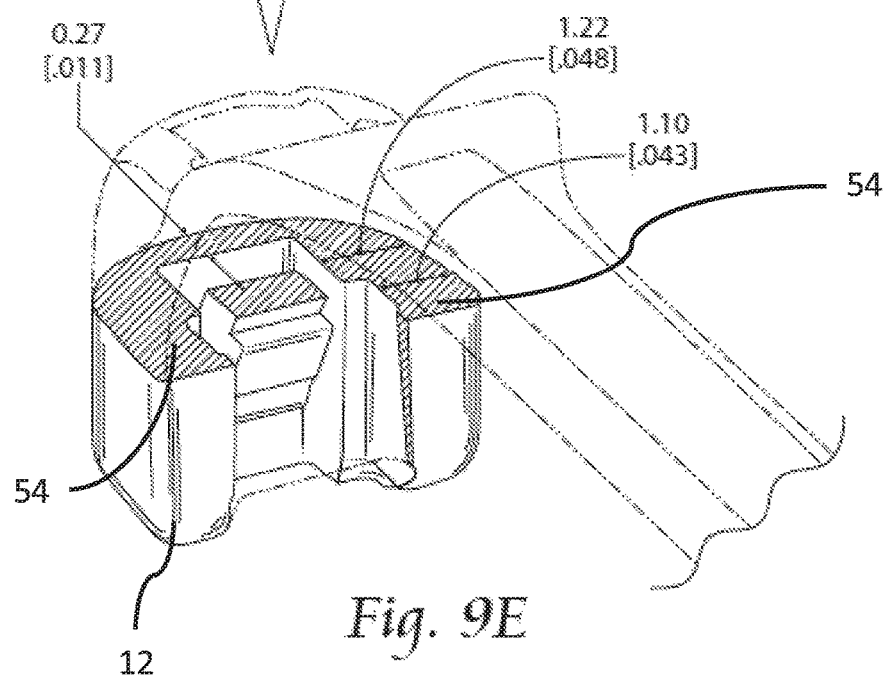
FIG. 9E is a dimensioned example of the cable tie of FIG. 9C according to the first embodiment of the invention.
Figure 13:
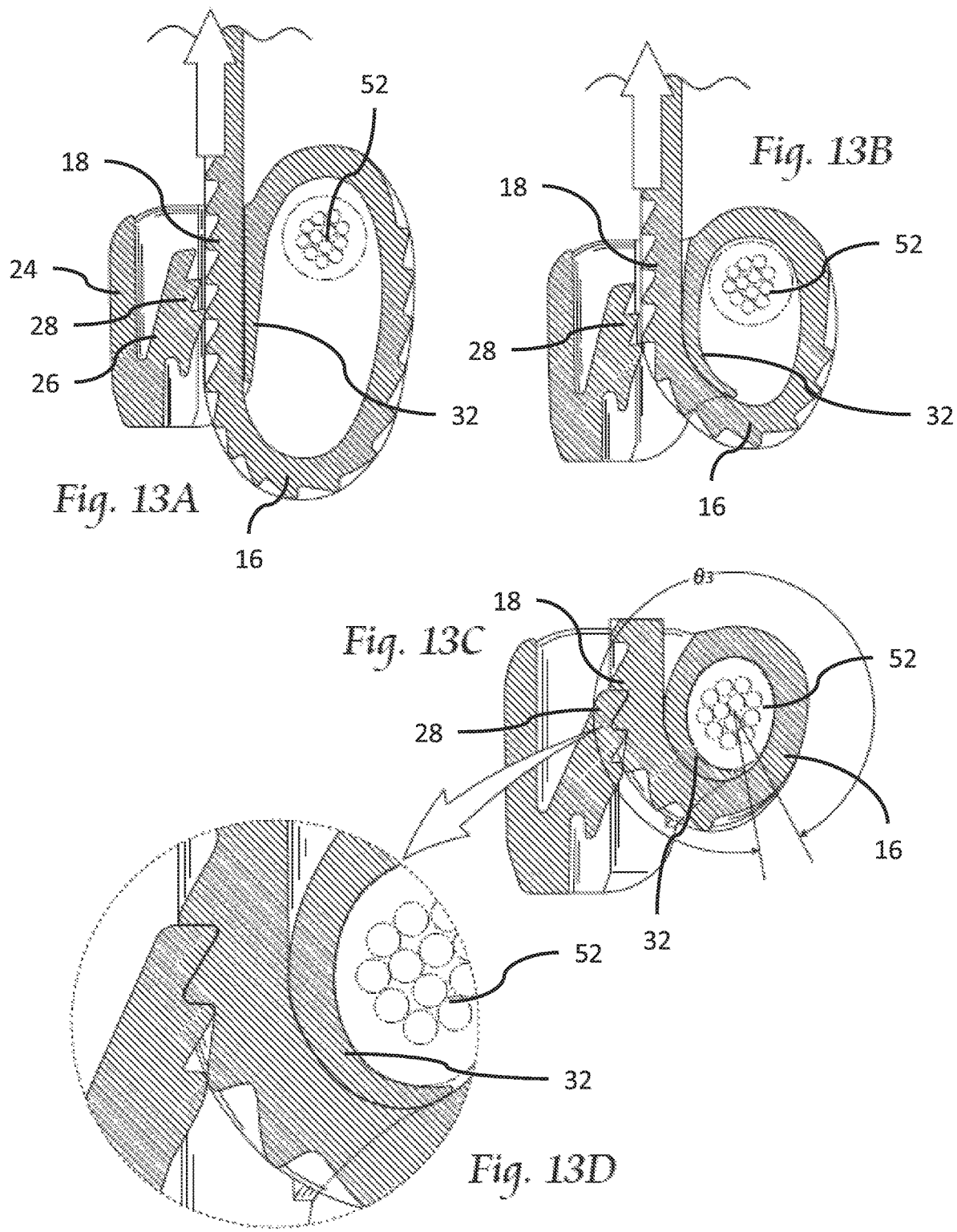
FIG. 13A is a cross section view of the cable tie of FIG. 10 along the section line 13A-13A wrapped around the single elongate article in a preliminary stage of tightening the cable tie according to the first embodiment of the invention.
FIG. 13B is a cross section view of the cable tie of FIG. 13A wrapped around the single elongate article in an intermediate stage of tightening the cable tie according to the first embodiment of the invention.
FIG. 13C is a cross section view of the cable tie of FIG. 13A wrapped around the single elongate article in a final stage of tightening the cable tie according to the first embodiment of the invention.
FIG. 13D is a close-up cross section view of the cable tie of FIG. 13C according to the first embodiment of the invention.

As illustrated in FIG. 9C, the aperture 14 also has adjacent walls 54 that are generally parallel to one another. Both adjacent walls 54 are generally perpendicular to the second wall 30. The adjacent walls 54 have a side wall thickness AW that is preferably greater than the sum of the first thickness $T_1$ and the second thickness $T_2$. The side wall thickness AW is more preferably calculated by the formula $[(T_2-T_1)/2] *4.5$. The strap height SH is preferably greater than the sum of the first thickness $T_1$ and the second thickness $T_2$. The strap width SW is preferably greater than the sum of the first thickness $T_1$ and the second thickness $T_2$.

FIGS. 13A-13D show the strap 16 in various stages of being tightened around the elongate article 52 having the smallest recommended bundle diameter. In the final stage of tightening shown in FIG. 13C, the second wall 30 and the strap 16 are in continuous contact with a circumference of the elongate article 52 defining an angle $\Theta_3$ in a range of 230 to 355 degrees, preferably in a range of 340 to 355 degrees, and more preferably in a range of 345 to 355 degrees after the strap 16 is inserted within the aperture 14 and tightened around the elongate article 52. As shown in FIG. 13C, a loop diameter defined by the second wall 30 and the strap 16 is substantially equal to a diameter of the elongate article 52 after the strap 16 is inserted within the aperture 14 and tightened around the elongate article 52. If the first thickness is decreased, the value of $\Theta_3$ will increase. Conversely, if the first thickness is increased, the value of $\Theta_3$ will decrease. As the reveal R is increased, the value of $\Theta_3$ will decrease. Conversely, as the reveal R is decreased, the value of $\Theta_3$ will increase.

Without subscribing to any particular theory of operation, because the second wall 30 yields as the strap 16 is tightened around the elongate article 52, the plurality of serrations 18 climb up the pawl 26 into tight mating engagement as shown in FIG. 13D which provides a high applied loop tensile force to the strap 16 which equates to high circumferential compression of the elongate article 52, i.e. the strap 16 is holding tighter around the elongate article 52 which is desired in many applications of the cable tie 10.

Figure 14:
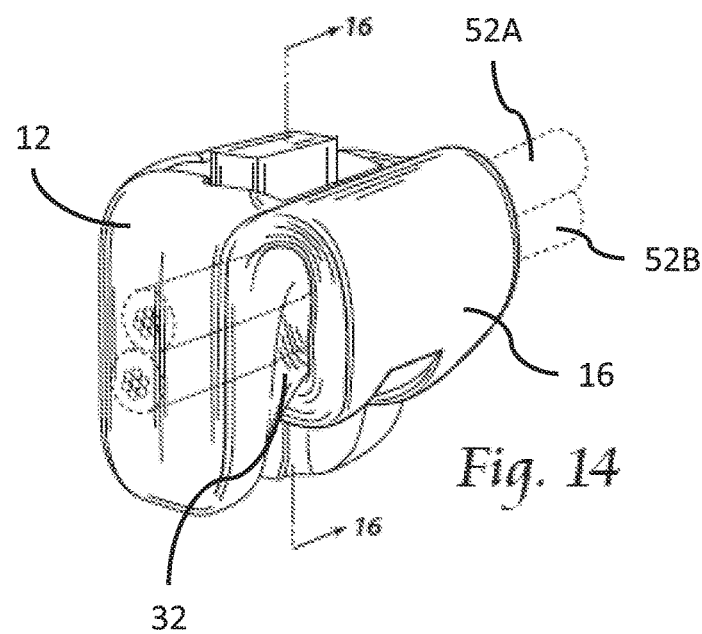
FIG. 14 is a partial perspective top view of the cable tie of FIG. 4 wrapped around two elongate articles according to the first embodiment of the invention.
Figure 15:
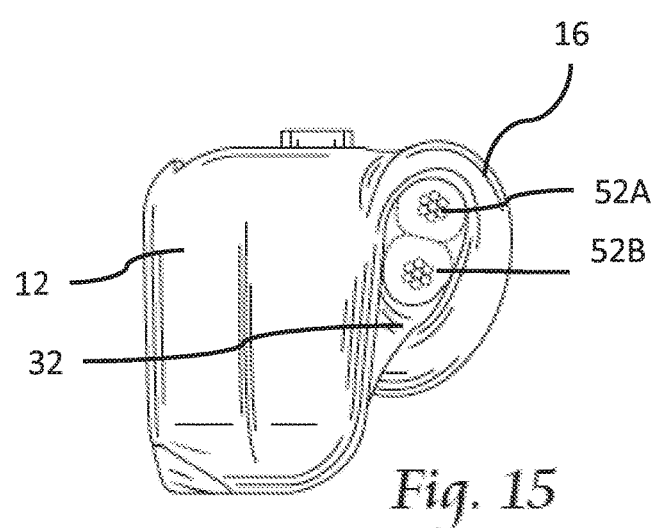
FIG. 15 is a right view of the cable tie of FIG. 14 wrapped around two elongate articles according to the first embodiment of the invention.
Figure 16:
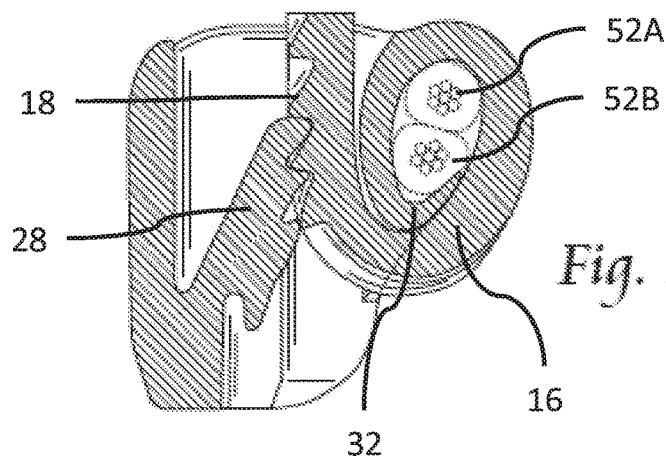
FIG. 16 is a cross section view of the cable tie of FIG. 15 wrapped around two elongate articles in a final stage of tightening the cable tie according to the first embodiment of the invention.
Figure 20:
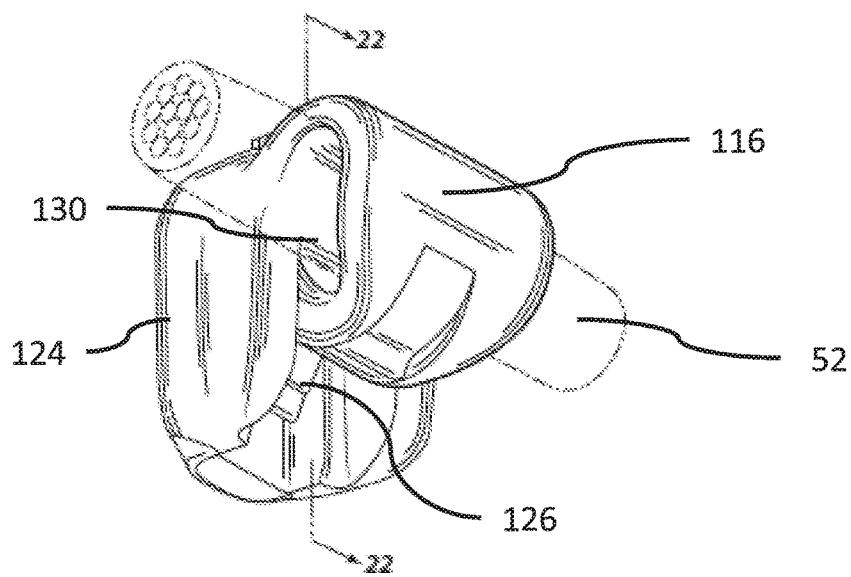
FIG. 20 is a partial perspective bottom view of the cable tie of FIG. 17 wrapped around the single elongate article according to the second embodiment of the invention.
Figure 21:
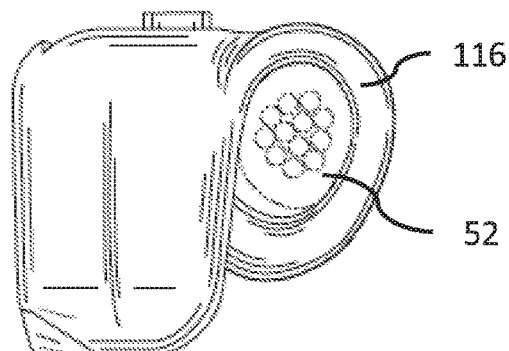
FIG. 21 is a right view of the cable tie of FIG. 17 wrapped around the single elongate article according to the second embodiment of the invention.
Figure 22:
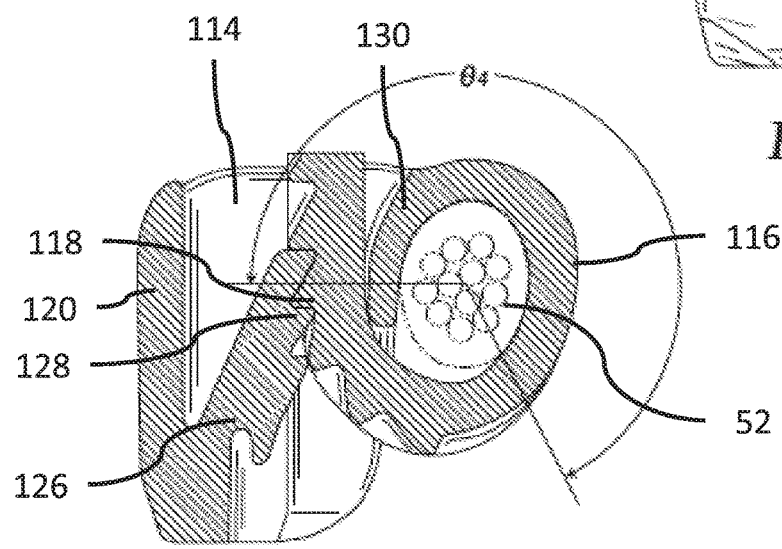
FIG. 22 is a cross section view of the cable tie of FIG. 20 along the section line 22-22 wrapped around the single elongate article in the final stage of tightening the cable tie according to the first embodiment of the invention.
Figure 23:
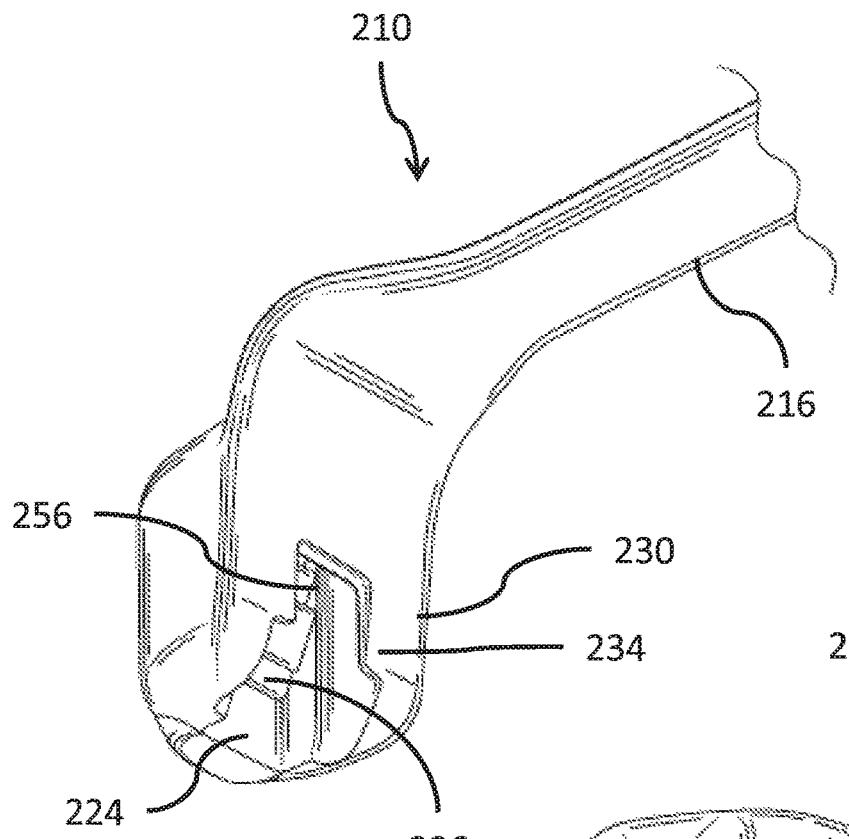
FIG. 23 is a perspective bottom view a cable tie according to a third embodiment of the invention.
Figure 24:
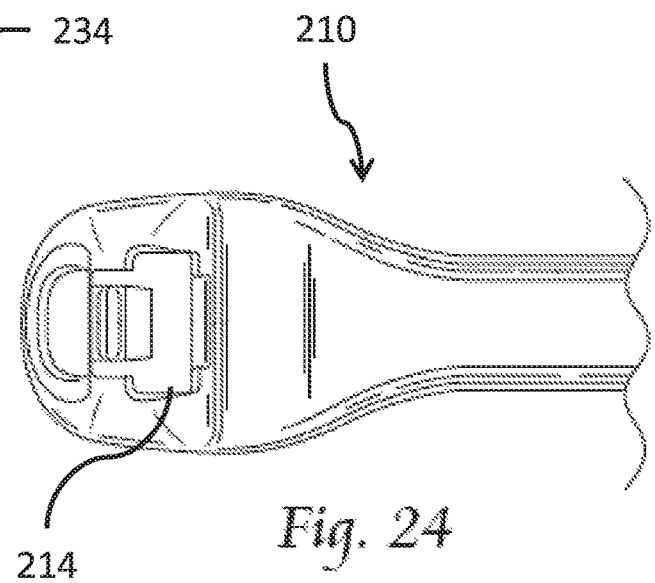
FIG. 24 is a bottom plan view the cable tie of FIG. 23 according to the third embodiment of the invention.
Figure 25:
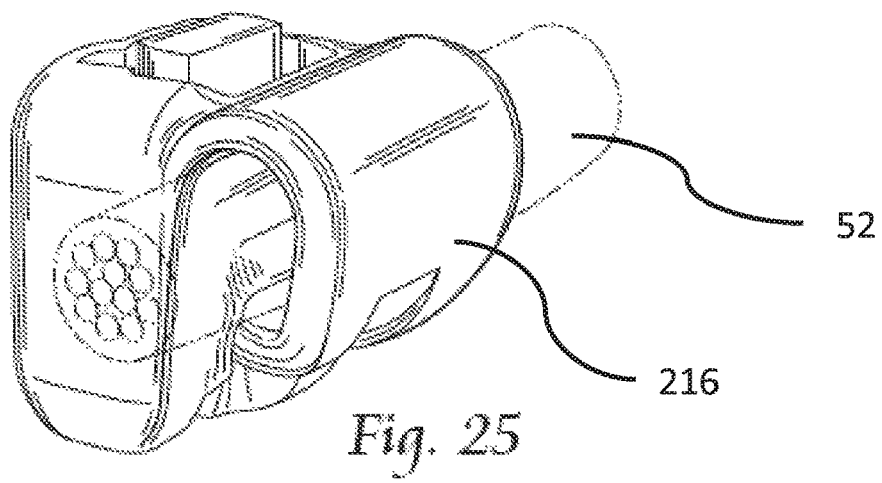
FIG. 25 is a partial perspective top view of the cable tie of FIG. 23 wrapped around a single elongate article according to the third embodiment of the invention.
Figure 26:
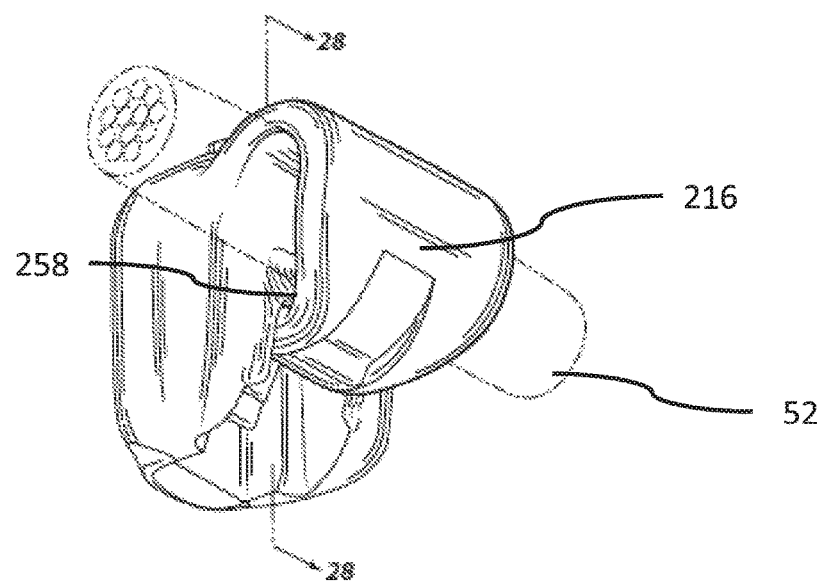
FIG. 26 is a partial perspective bottom view of the cable tie of FIG. 23 wrapped around the single elongate article according to the third embodiment of the invention.
Figure 27:
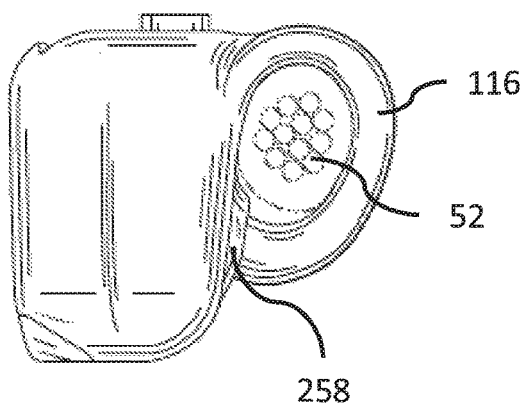
FIG. 27 is a right view of the cable tie of FIG. 23 wrapped around the single elongate article according to the third embodiment of the invention.
Figure 28:
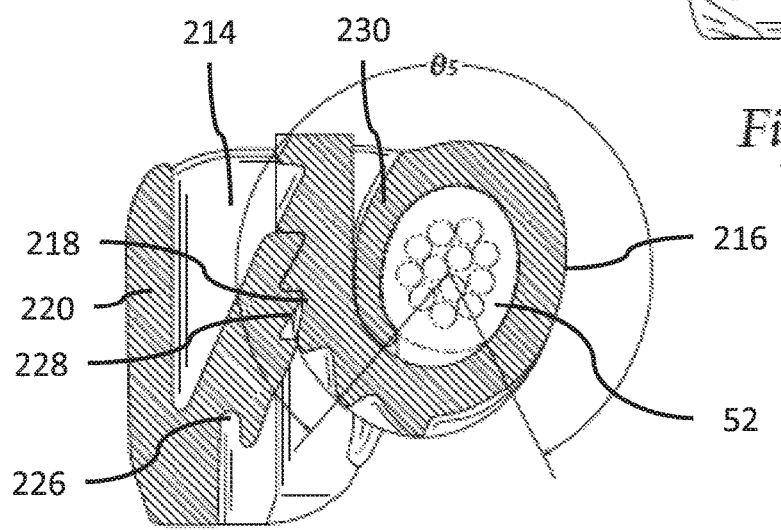
FIG. 28 is a cross section view of the cable tie of FIG. 26 along the section line 28-28 wrapped around the single elongate article in a final stage of tightening the cable tie according to the first embodiment of the invention.

FIGS. 14-16 illustrate the cable tie 10 with the strap 16 wrapped around two elongate articles 52A, 52B, in the illustrated example a pair insulated wire cables. The second wall 30 and strap 16 may form a generally circular shape when tightened around a single elongate article 52 having a single element and may form a generally oval shape when tightened around an elongate article 52A. 52B having multiple elements.

FIGS. 17-22 illustrate a cable tie 110 in which the second wall 130 of the aperture 114 is shorter than the first wall 124 and the second wall 130 does not extend past a first engaging tooth of the plurality of teeth 128 of the pawl 126. As used herein, the first engaging tooth is the tooth in the plurality of teeth 128 that is closest to the first opening 20. In the final stage of tightening shown in FIG. 22 wrapped around the smallest recommended single bundle diameter, the second wall 130 and the strap 116 are in continuous contact with a circumference of the elongate article 52 defining an angle $\Theta_4$ of in a range of 220 to 260 degrees, preferably in a range of 230 to 260 degrees, and more preferably in a range of 240 to 260 degrees after the strap 116 is inserted within the aperture 114 and tightened around the elongate article 52.

FIGS. 23-28 illustrate a cable tie 210 in which second wall 230 defines a slot 256 that in the first portion 234 that is less than a width of the second wall 230. In the final stage of tightening shown in FIG. 28 wrapped around the smallest recommended single bundle diameter, the second wall 230 and the strap 216 are in continuous contact with a circumference of the elongate article 52 defining an angle $\Theta_5$ in a range of 260 to 300 degrees, preferably in a range of 270 to 300 degrees, and more preferably in a range of 280 to 330 degrees after the strap 216 is inserted within the aperture 214 and tightened around the elongate article 52. The remainder of the first portion 234 forms a lip 258 around the perimeter of the slot 256. This will allow the strap 216 to tightly fit smaller elongate articles when the strap 216 is subjected to higher tension forces, thereby allowing the strap 216 to bypass the lip 258. The cable tie 210 provides a consistent strap preload that provides a ratcheting tactile audio engagement sound heard during the strap insertion process, and the first engaging pawl tooth will engage the plurality of serrations 218 with a section of the adjacent wall cutout.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments, and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. A cable tie, comprising:
   a cable tie head; and
   a strap, wherein the cable tie head is configured to receive the strap, wherein at least part of the cable tie head comprises a deformable zone configured to deform when the strap is received in the cable tie head to secure the cable tie to an elongate article,
   wherein the strap defines a plurality of serrations,
   wherein the cable tie head further comprises a first wall arranged opposite a second wall that define an aperture extending through the cable tie head, the aperture having a first opening through which the strap enters the aperture and a second opening through which the strap exits the aperture,
   wherein the first wall comprises a pawl with a plurality of teeth configured to engage the plurality of serrations of the strap,
   wherein the second wall comprises the deformable zone, wherein the deformable zone extends from a first portion with a first thickness that is proximate to the first opening to a second portion having a second thickness that is proximate the second opening, wherein the second thickness is greater than the first thickness.

2. The cable tie in accordance with claim 1, wherein the deformable zone is configured to deform in response to application of a force on the strap when securing the cable tie to the elongate article.

3. The cable tie in accordance with claim 2, wherein the second wall defines a slot that is less than a width of the second wall and wherein the slot extends through the deformable zone.

4. The cable tie in accordance with claim 1, wherein the second wall defines a converging angle between the first thickness and the second thickness that is greater than 1 degree.

5. The cable tie in accordance with claim 4, wherein the converging angle between the first thickness and the second thickness is in a range of 1 to 10 degrees inclusive.

6. The cable tie in accordance with claim 2, wherein the second wall defines a slot that is less than a width of the second wall, wherein the slot extends through the second wall opposite the pawl, and wherein the second wall is shorter than the first wall.

7. The cable tie in accordance with claim 1, wherein at least a section the deformable zone varies gradually between the first thickness and the second thickness.

8. The cable tie in accordance with claim 1, wherein at least a section of the deformable zone varies continuously between the first thickness and the second thickness.

9. The cable tie in accordance with claim 1, wherein the first portion of the deformable zone is configured to flare outwardly at the first opening away from the first wall after the strap is inserted within the aperture and tightened around the elongate article.

10. The cable tie in accordance with claim 1, wherein the aperture defines a third wall that is generally perpendicular to the second wall and wherein the third wall has a third thickness that is greater than a sum of the first thickness and the second thickness.

11. The cable tie in accordance with claim 1, wherein a ratio of the first thickness to the second thickness in a range of 1:3 to 1:10.

12. The cable tie in accordance with claim 1, wherein the strap extends from the cable tie head in a direction generally perpendicular to a longitudinal axis of the aperture extending from the first opening to the second opening.

13. The cable tie in accordance with claim 1, wherein a ratio of a width of the second wall to a height of the second wall is in a range of 1:3 to 3:4.

14. The cable tie in accordance with claim 1, wherein the deformable zone is flexible and configured to deform outwardly away from the first wall after the strap is inserted within the aperture and tightened around the elongate article.

15. The cable tie in accordance with claim 14, wherein the second wall and the strap are in continuous contact with 330 to 355 degrees of a circumference of the elongate article after the strap is inserted within the aperture and tightened around the elongate article.

16. The cable tie in accordance with claim 14, wherein a loop diameter defined by the second wall and the strap is substantially equal to a diameter of the elongate article after the strap is inserted within the aperture and tightened around the elongate article.

17. A cable tie, comprising:
   a cable tie head;
   an aperture extending through the cable tie head;
   a strap defining a plurality of serrations extending from the cable tie head and configured to be received within the aperture, wherein the aperture defines a first opening through which the strap enters the aperture and a second opening through which the strap exits the aperture;
   a first wall forming the aperture, wherein the first wall defines a pawl with a plurality of teeth configured to engage the plurality of serrations of the strap; and
   a second wall forming the aperture opposite the first wall, wherein the second wall is shorter than the first wall and wherein the second wall does not extend past a first engaging tooth of the plurality of teeth of the pawl, the second wall further comprising a deformable zone configured to deform when the strap is received in the cable tie head to secure the cable tie to an elongate article, wherein the deformable zone extends from a first portion with a first thickness that is proximate to the first opening to a second portion having a second thickness that is proximate the second opening, and wherein the second thickness is greater than the first thickness.

18. The cable tie in accordance with claim 17, wherein the strap extends from the cable tie head in a direction generally perpendicular to a longitudinal axis of the aperture extending from the first opening to the second opening.

19. The cable tie in accordance with claim 17, wherein the second wall and the strap are in continuous contact with 260 to 300 degrees of a circumference of the elongate article after the strap is inserted within the aperture and tightened around the elongate article.

20. A cable tie, comprising:
a cable tie head;
an aperture extending through the cable tie head;
a strap defining a plurality of serrations extending from the cable tie head and configured to be received within the aperture, wherein the aperture defines a first opening through which the strap enters the aperture and a second opening through which the strap exits the aperture;
a first wall forming the aperture, wherein the first wall defines a pawl with a plurality of teeth configured to engage the plurality of serrations of the strap;
a second wall forming the aperture opposite the first wall; and
means for deforming the second wall in response to application of a force on the strap when securing the cable tie to an elongate article, wherein the means for deforming the second wall in response to application of a force on the strap when securing the cable tie to an elongate article extends from a first portion with a first thickness that is proximate to the first opening to a second portion having a second thickness that is proximate the second opening, wherein the second thickness is greater than the first thickness.

* * * * *